(12) United States Patent
Marshall et al.

(10) Patent No.: US 11,406,210 B2
(45) Date of Patent: Aug. 9, 2022

(54) STORAGE CLIP

(71) Applicant: POLYPLOT LLC, Morrison, CO (US)

(72) Inventors: Collin Marshall, Englewood, CO (US); Donald Marshall, Morrison, CO (US)

(73) Assignee: POLYPLOT LLC, Morrison, CO (US)

( * ) Notice: Subject to any disclaimer, the term of this patent is extended or adjusted under 35 U.S.C. 154(b) by 0 days.

(21) Appl. No.: 17/039,458

(22) Filed: Sep. 30, 2020

(65) Prior Publication Data
US 2022/0095820 A1    Mar. 31, 2022

(51) Int. Cl.
*A47G 25/06* (2006.01)
*F16B 2/00* (2006.01)
*F16B 2/22* (2006.01)
*F16M 13/02* (2006.01)

(52) U.S. Cl.
CPC .......... *A47G 25/0607* (2013.01); *F16B 2/005* (2013.01); *F16B 2/22* (2013.01); *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 458,783 A * | 9/1891 | Bleha | ................... | A42B 7/00 2/175.7 |
| 1,281,656 A * | 10/1918 | Raschick | ................. | A45F 5/02 24/3.12 |
| 1,415,126 A * | 5/1922 | Stahle | .................... | A47G 25/08 248/308 |
| 1,570,451 A * | 1/1926 | Simoneau | ............. | A47G 25/10 211/30 |
| 2,470,879 A * | 5/1949 | Wiggins | ................ | A47G 25/10 211/32 |
| 3,100,324 A | 8/1963 | Tutino et al. | | |
| 4,005,510 A * | 2/1977 | Noda | ........................ | A41F 3/02 24/504 |
| 4,308,981 A * | 1/1982 | Miura | .................. | A47G 25/481 223/96 |
| 4,453,656 A * | 6/1984 | Gillum | ...................... | A45F 5/02 224/247 |
| 4,673,153 A * | 6/1987 | Hilty | ......................... | A47F 7/06 211/30 |
| 4,840,341 A * | 6/1989 | Hasegawa | ................ | A47G 1/21 211/89.01 |
| 5,118,065 A * | 6/1992 | Becklund | ............... | A47G 25/06 248/231.51 |
| 5,159,730 A * | 11/1992 | Radvin | .................. | A44B 99/00 24/543 |
| 5,165,147 A * | 11/1992 | Kuo | ........................ | D06F 55/02 24/346 |
| 5,697,594 A | 12/1997 | Adams et al. | | |

(Continued)

*Primary Examiner* — Monica E Millner
(74) *Attorney, Agent, or Firm* — Marshall, Gerstein & Borun LLP

(57) ABSTRACT

A storage clip includes a first finger having a top surface and a bottom surface, and a second finger having a top surface facing the first finger and a bottom surface facing away from the first finger. The second finger is connected to the first finger with an integral hinge that produces a biasing force such that a first end of the first finger is biased towards a first end of the second finger. An integral connector extends from the bottom surface of the second finger.

19 Claims, 5 Drawing Sheets

(56) References Cited

U.S. PATENT DOCUMENTS

| | | | | |
|---|---|---|---|---|
| 5,890,638 | A * | 4/1999 | Woloshen | A45F 5/021 224/247 |
| 5,944,236 | A * | 8/1999 | Cinque | D06F 95/008 223/1 |
| 6,425,167 | B1 * | 7/2002 | Barbarite | A47G 25/00 24/298 |
| 6,533,132 | B1 * | 3/2003 | Weisenburger | A01K 97/08 211/118 |
| 6,543,737 | B2 * | 4/2003 | Decker | A47K 10/185 248/316.1 |
| D478,723 | S * | 8/2003 | Blanton | D3/215 |
| 6,698,071 | B1 * | 3/2004 | Greer, Jr. | F16B 2/10 24/507 |
| 7,051,406 | B1 * | 5/2006 | Morris | A42B 1/247 2/10 |
| D547,171 | S * | 7/2007 | Snell | D8/395 |
| 7,581,292 | B2 * | 9/2009 | Votel | A45F 5/004 24/336 |
| 9,289,052 | B2 * | 3/2016 | Griffith | A45F 5/06 |
| D761,001 | S * | 7/2016 | Kouns | D2/895 |
| 9,930,983 | B2 * | 4/2018 | Ballard | A47F 7/06 |
| D830,159 | S * | 10/2018 | Montgomery | D8/395 |
| 2003/0126722 | A1 * | 7/2003 | Thompson | B60J 3/0204 24/3.12 |
| 2014/0305976 | A1 * | 10/2014 | Stallworth | A45F 5/02 224/269 |
| 2015/0238035 | A1 * | 8/2015 | Montgomery | A47G 25/483 223/96 |
| 2017/0208888 | A1 * | 7/2017 | Volmer | A42B 1/24 |
| 2019/0254457 | A1 * | 8/2019 | Drapeau | F16B 1/04 |
| 2020/0124066 | A1 * | 4/2020 | Betcher | A45F 5/00 |
| 2020/0189478 | A1 * | 6/2020 | Sanchez | B60R 7/043 |

* cited by examiner

STORAGE CLIP

FIELD OF THE DISCLOSURE

The disclosure relates generally to storage clips that attach to shelves and more specifically to storage clips for hats that attach to shelves.

BACKGROUND

Storing clothes generally takes up a significant amount of space. Often, clothing items must be stored in certain ways to avoid wrinkling or otherwise unsightly appearances. Some clothing items, such as shirts and pants, can be folded and stored on a shelf, but folding requires significant shelf or drawer space for storage.

Hats can present a unique storage problem in that hats often have a rigid or semi-rigid portion (e.g., the bill of a baseball hat or the brim of a top hat), and the body of the hat encloses significant empty space, which is needed to fit over the wearer's head. Usually, hat storage involves hanging the hat on a hook or resting the hat on a shelf. Installing hooks requires time, effort, and vacant wall space, and resting hats on a shelf can cause additional storage problems. For example, if resting separately, a large area of the shelf is consumed by the stored hats. Alternatively, if the hats are stacked on one another to save space, wrinkles or creases can occur and only the top hat may be visible, which causes the wearer to search for a desired hat if it is not on the top.

SUMMARY OF THE DISCLOSURE

According to a first embodiment, a storage clip includes a first finger having a top surface and a bottom surface, and a second finger having a top surface facing the first finger and a bottom surface facing away from the first finger. The second finger is connected to the first finger with an integral hinge that produces a biasing force such that a first end of the first finger is biased towards a first end of the second finger. An integral connector extends from the bottom surface of the second finger.

According to a second embodiment, a storage clip assembly includes a storage clip having a first finger having a top surface and a bottom surface, a second finger having a top surface facing the first finger and a bottom surface facing away from the first finger. The second finger is connected to the first finger by an integral hinge that produces a biasing force such that a first end of the first finger is biased towards a first end of the second finger. A connector extends from the bottom surface of the second finger. A clothing item is located at least partially between the bottom surface of the first finger and the top surface of the second finger.

The foregoing embodiments of a storage clip or a storage clip assembly may further include any one or more of the following optional features, structures, and/or forms.

In some optional forms, the connector comprises a first leg and a second leg spaced apart from the first leg.

In other optional forms, a longitudinal axis of the second leg forms an acute angle with a longitudinal axis of the first leg at a projected intersection point when viewed from a side.

In yet other optional forms, the acute angle is between about 20 degrees and about 70 degrees.

In yet other optional forms, the second leg includes a turned out foot.

In yet other optional forms, the first and second legs are spaced from one another along a length of the second finger and the space between the first and second legs is between about 1 cm and 5 cm.

In yet other optional forms, the integral hinge is a curved hinge.

In yet other optional forms, the curved hinge is located between a first leg of the connector and a second leg of the connector along a length of the second finger.

In yet other optional forms, the curved hinge biases a second end of the first finger away from a second end of the second finger.

In yet other optional forms, the bottom surface of the first finger includes gripping teeth proximate the first end of the first finger.

In yet other optional forms, the top surface of the second finger includes gripping teeth proximate the first end of the second finger.

In yet other optional forms, the clothing item is a baseball-type hat having a brim and the brim is at least partially located between the first finger and the second finger.

In yet other optional forms, the storage clip is removably connected to a shelf by the connector.

BRIEF DESCRIPTION OF THE DRAWINGS

While the specification concludes with claims particularly pointing out and distinctly claiming the subject matter, which is regarded as forming the present invention, the invention will be better understood from the following description taken in conjunction with the accompanying drawings.

DETAILED DESCRIPTION

Figure 1:
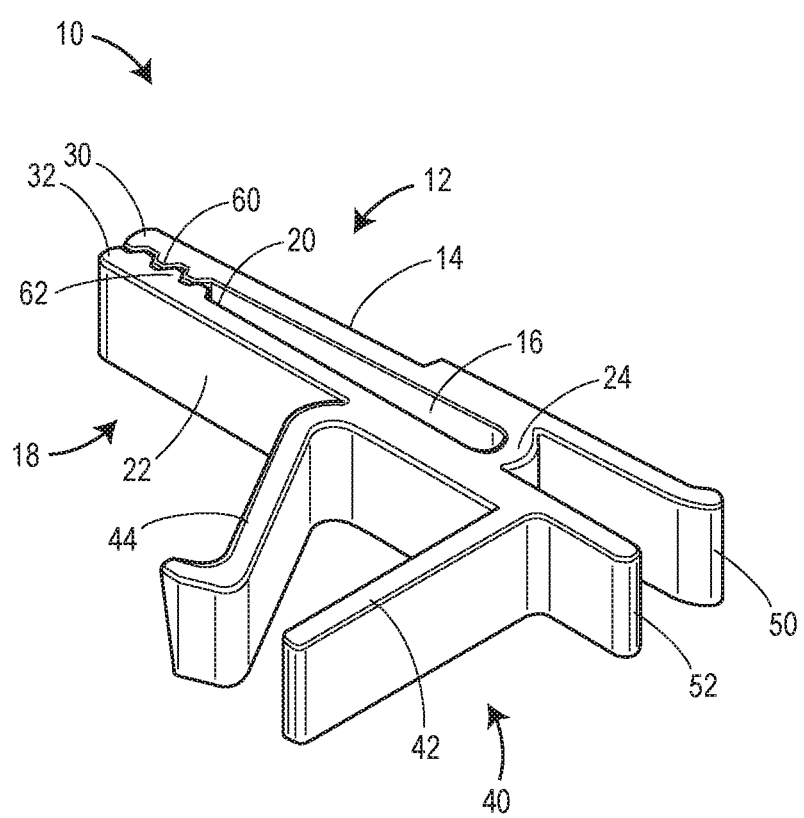
FIG. 1 is a side perspective view of a hat clip constructed in accordance with the teachings of the disclosure.

Turning now to FIGS. 1-7, a storage clip 10 includes a first finger 12 having a top surface 14 and a bottom surface 16, and a second finger 18 having a top surface 20 facing the first finger 12 and a bottom surface 22 facing away from the first finger 12. The second finger 18 is connected to the first finger 12 with an integral hinge 24 that produces a biasing force such that a first end 30 of the first finger 12 is biased towards a first end 32 of the second finger 18. An integral connector 40 extends from the bottom surface 22 of the second finger 18. The integral connector 40 is used to attach the storage clip 10 to a shelf, as described further below.

The connector 40 comprises a first leg 42 and a second leg 44 spaced apart from the first leg 42. As illustrated in FIG.

Figure 2:
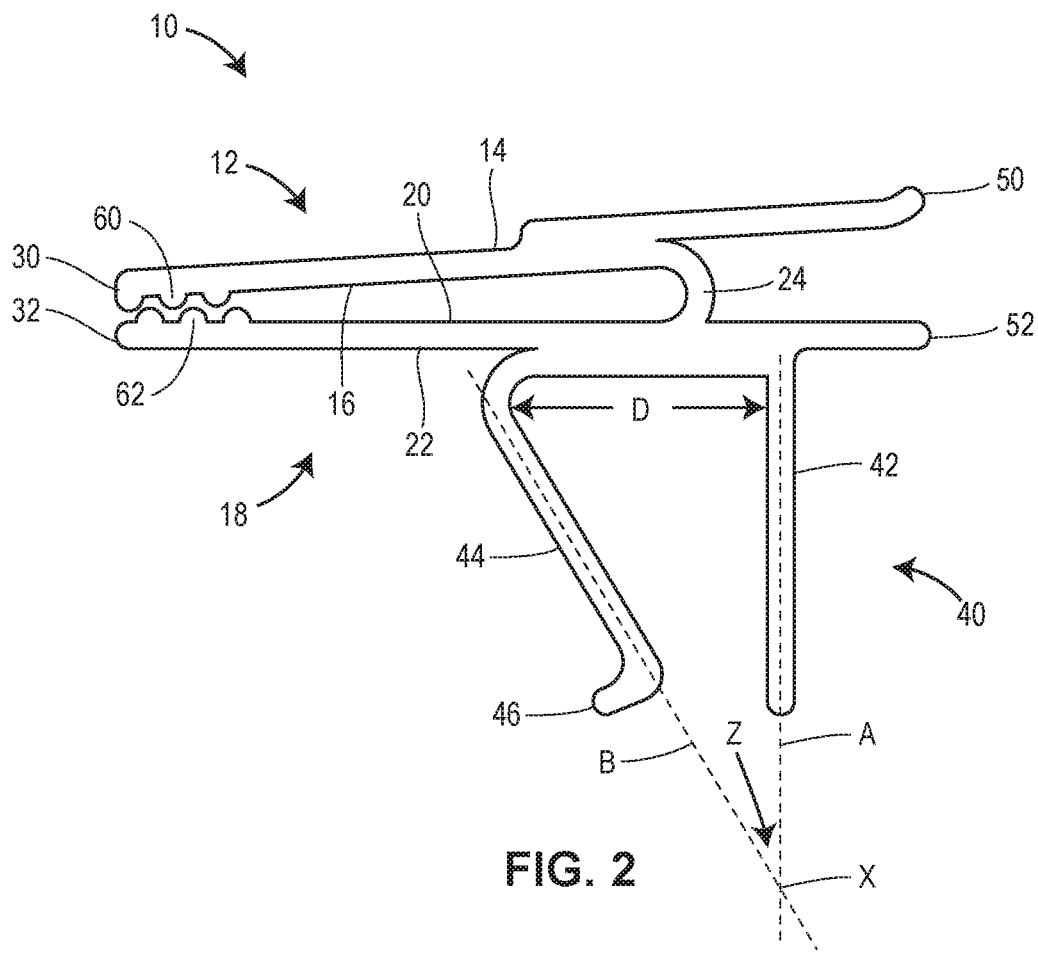
FIG. 2 is a side view of a first side of the hat clip of FIG. 1.
Figure 3:
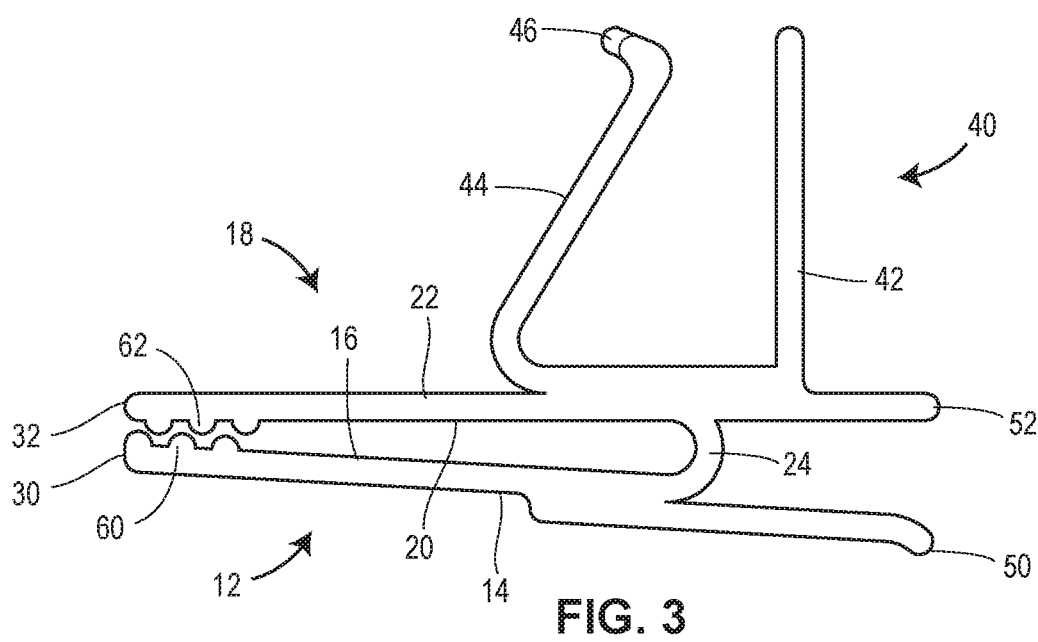
FIG. 3 is a side view of a second side of the hat clip of FIG. 1, which is opposite from the first side illustrated in FIG. 2.
Figure 4:
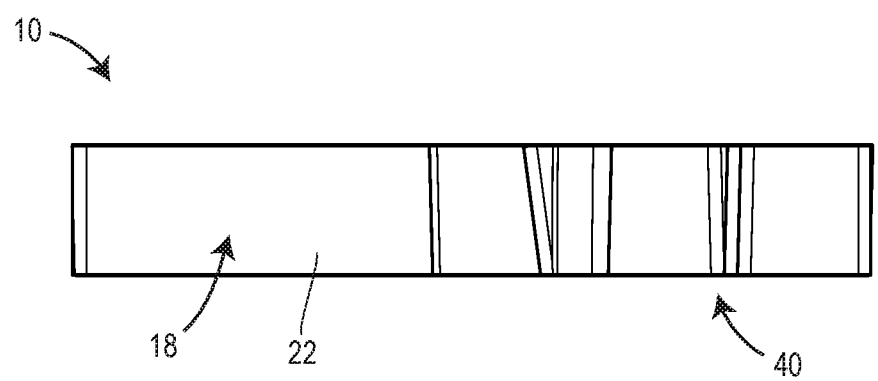
FIG. 4 is a bottom view of the hat clip of FIG. 1.
Figure 5:
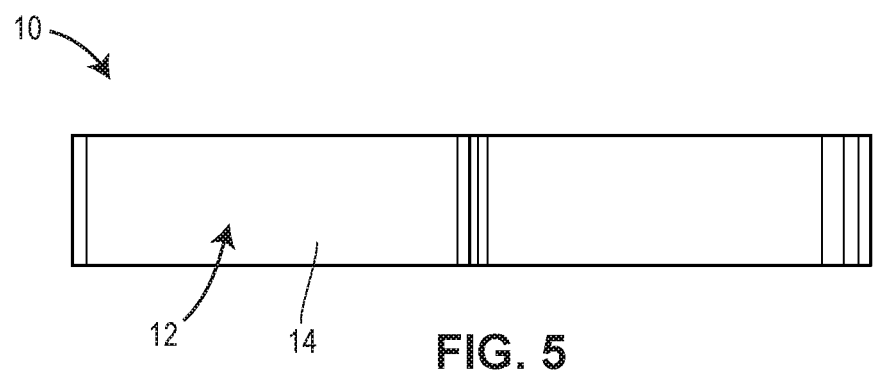
FIG. 5 is a top view of the hat clip of FIG. 1.
Figure 6:
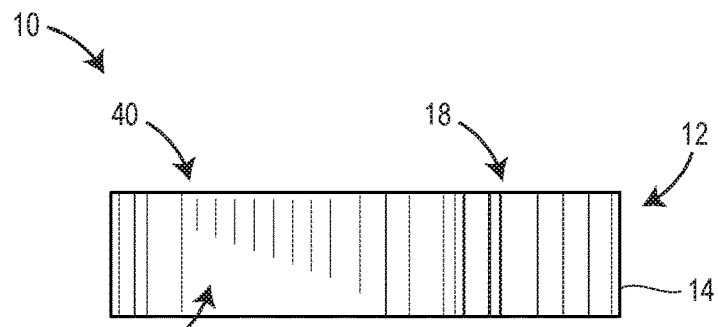
FIG. 6 is a front view of the hat clip of FIG. 1.
Figure 7:
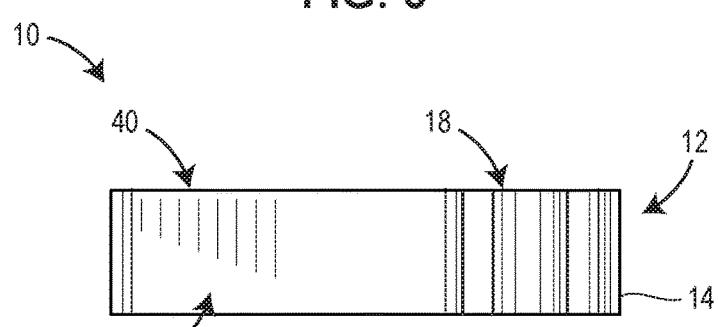
FIG. 7 is a rear view of the hat clip of FIG. 1.

2, a longitudinal axis B of the second leg 44 forms an acute angle Z with a longitudinal axis A of the first leg 42 at a projected intersection point X when viewed from a side (e.g., FIGS. 2 and 3). The acute angle Z is between about 20 degrees and about 70 degrees. A bottom of the second leg 44 includes a turned out foot 46. The turned out foot 46 helps guide the shelf between the first leg 42 and the second leg 44 when the storage clip 10 is attached to the shelf, as is discussed further below. In some embodiments, the first leg 42 and the second leg 44 are spaced from one another along a length of the second finger 18 by a distance D, which is between about 1 cm and 5 cm when measured at the base of the first leg 42 and the base of the second leg 44. In other embodiments, the distance D may approximate a thickness of a shelf to which the storage clip 10 is attached.

In some embodiments, the integral hinge 24 is a curved hinge, as best illustrated in FIGS. 1-3. The integral hinge 24 is located between the first leg 42 of the connector 40 and the second leg 44 of the connector 40 as measured along a length of the second finger 18. The integral hinge 24 biases a second end 50 of the first finger 12 away from a second end 52 of the second finger 18.

The bottom surface 16 of the first finger 12 includes a first plurality of gripping teeth 60 proximate the first end 30 of the first finger 12. Similarly, the top surface 20 of the second finger 18 includes a second plurality of gripping teeth 62 proximate the first end 32 of the second finger 18. The gripping teeth 60 secure an item between the first finger 12 and the second finger 18, and are especially beneficial when the item is held in a vertical position from above, for example, when a hat is held vertically and is located below the shelf, as illustrated in FIG. 8.

Figure 8:
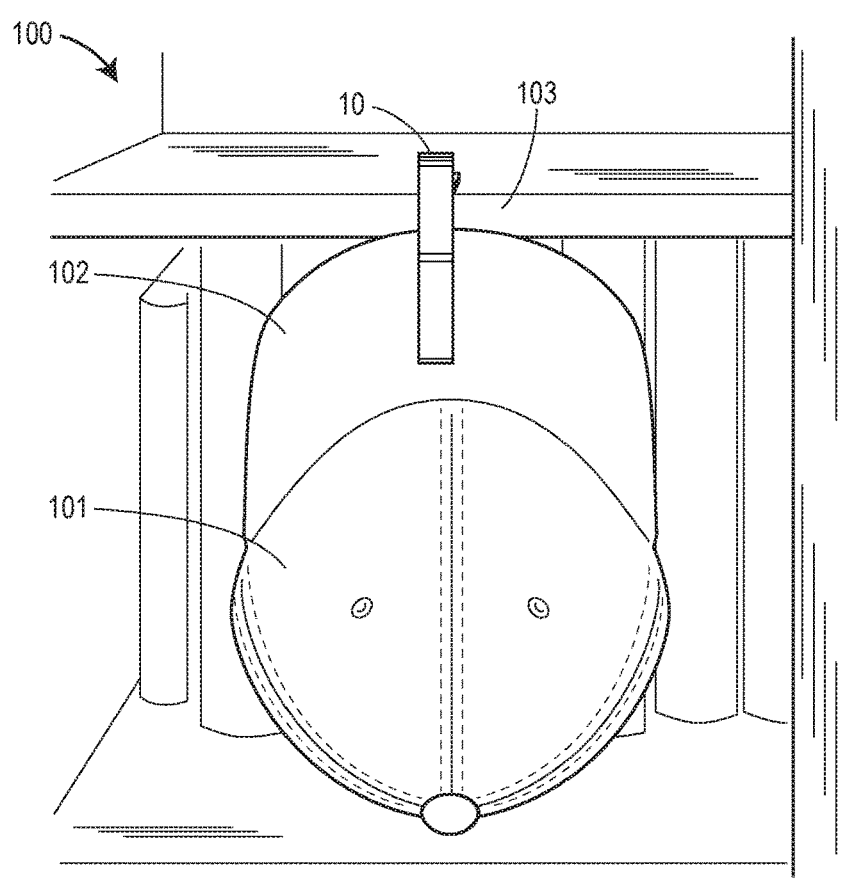
FIG. 8 is a front view of the hat clip of FIG. 1 holding a hat and attached to a shelf, the hat being held in a vertical position below the shelf.
Figure 9:
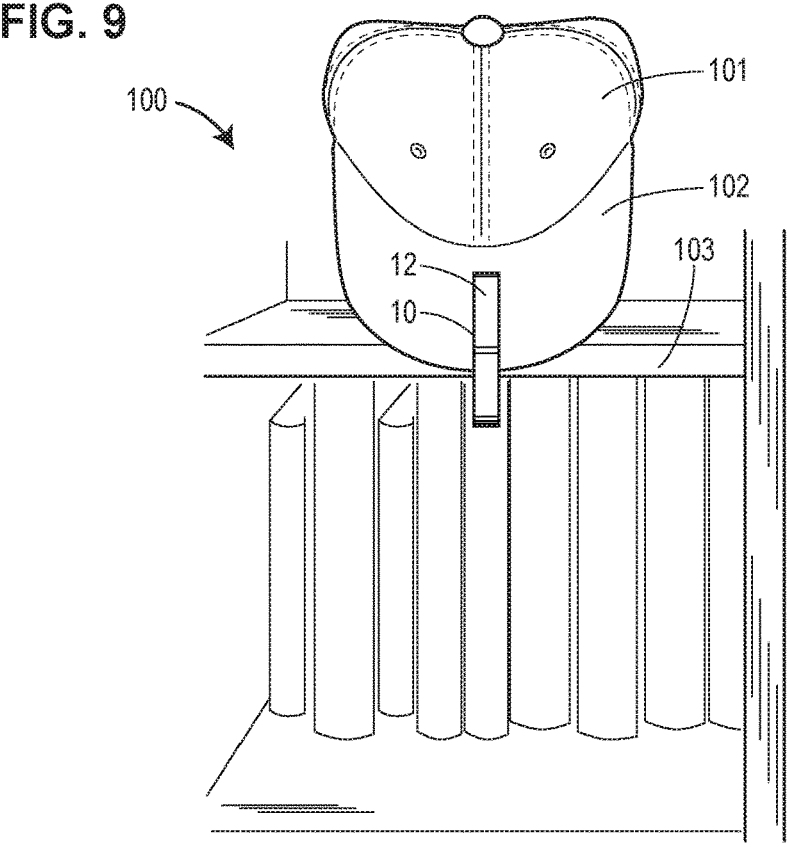
FIG. 9 is a front view of the hat clip of FIG. 1 holding a hat and attached to a shelf, the hat being held in a vertical position above the shelf.
Figure 10:
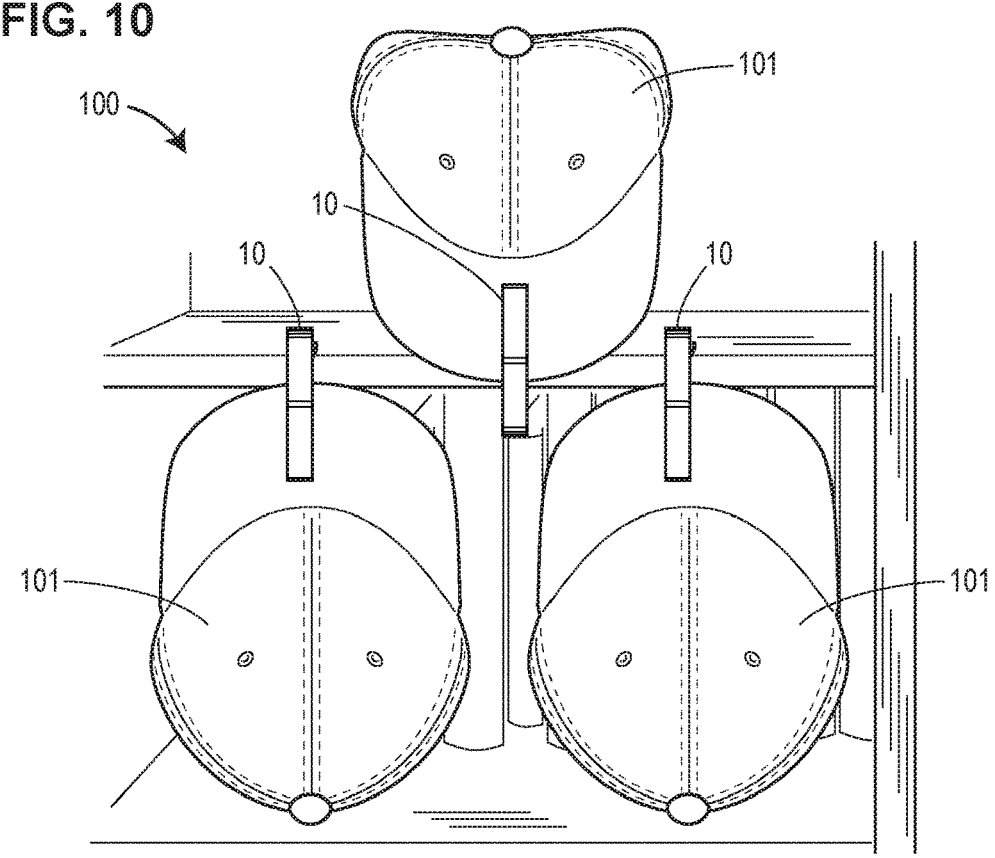
FIG. 10 is a front view of a plurality of hat clips of FIG. 1, each holding a hat and attached to a shelf.

Turning now to FIGS. 8-10, a storage clip assembly 100 includes the storage clip 10, as described above with respect to FIGS. 1-7. A clothing item, such as a hat 101, is located at least partially between the bottom surface 16 of the first finger 12 and the top surface 20 of the second finger 18, and more specifically is disposed between gripping teeth 60 and 62. In the illustrated embodiment, The clothing item is a baseball-type hat having a brim 102 and the brim 102 is at least partially located between the first finger 12 and the second finger 18. In other embodiments, another part of the hat 101, such as the body of the hat, may be disposed between the first finger 12 and the second finger 18. The storage clip 10 is removably connected to a shelf 103 by the connector 40.

The disclosed storage clips 10 advantageously use otherwise unused storage space directly above and below an end of a shelf to store clothing items, such as hats. Furthermore, the disclosed storage clips 10 advantageously simultaneously display and store the hats so that particular hats can be quickly identified and located even while efficiently stored. For example, the color, type, and size of the hat are readily ascertainable because the entire hat is visible when stored above or below the shelf. Furthermore, decorations, words, or logos disposed on the hat are also clearly visible to aid in clothing coordination or other selection of an appropriate hat for a given circumstance.

From a purely functional standpoint, a preferred storage clip may or may not have all the features illustrated here. The illustrated storage clip, on the other hand, has a specific, ornamental arrangement for the fingers and the connector. This illustrated arrangement adds to the cost of manufacture, so the illustrated storage clip does not provide all of the possible economic advantages that might be derived from the invention. On the other hand, this arrangement is believed to be aesthetically pleasing and is likely to be recognized and relied upon by purchasers to identify the source of the storage clip.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A storage clip comprising:
a first finger having a top surface and a bottom surface;
a second finger having a top surface facing the first finger and a bottom surface facing away from the first finger, the second finger being connected to the first finger with an integral hinge that produces a biasing force such that a first end of the first finger is biased towards a first end of the second finger; and
an integral connector comprising a first leg and a second leg that extend away from the bottom surface of the second finger in a direction away from the first finger, a base of the first leg and a base of the second leg being spaced apart by a distance along a length of the second finger,
wherein a longitudinal axis of the second leg forms an acute angle with a longitudinal axis of the first leg at a projected intersection point when viewed from a side.

2. The storage clip of claim 1, wherein the acute angle is between about 20 degrees and about 70 degrees.

3. A storage clip comprising:
a first finger having a top surface and a bottom surface;
a second finger having a top surface facing the first finger and a bottom surface facing away from the first finger, the second finger being connected to the first finger with an integral hinge that produces a biasing force such that a first end of the first finger is biased towards a first end of the second finger; and
an integral connector comprising a first leg and a second leg that extend away from the bottom surface of the second finger in a direction away from the first finger, a base of the first leg and a base of the second leg being spaced apart by a distance along a length of the second finger,
wherein the second leg includes a turned out foot.

4. The storage clip of claim 1, wherein the integral hinge is a curved hinge.

5. A storage clip comprising:
a first finger having a top surface and a bottom surface;
a second finger having a top surface facing the first finger and a bottom surface facing away from the first finger, the second finger being connected to the first finger with an integral hinge that produces a biasing force such that a first end of the first finger is biased towards a first end of the second finger; and
an integral connector comprising a first leg and a second leg that extend away from the bottom surface of the second finger in a direction away from the first finger, a base of the first leg and a base of the second leg being spaced apart by a distance along a length of the second finger,
wherein the integral hinge is a curved hinge, and
wherein the curved hinge is located between a first leg of the connector and a second leg of the connector along a length of the second finger.

6. A storage clip comprising:
a first finger having a top surface and a bottom surface;
a second finger having a top surface facing the first finger and a bottom surface facing away from the first finger, the second finger being connected to the first finger with an integral hinge that produces a biasing force such that a first end of the first finger is biased towards a first end of the second finger; and
an integral connector comprising a first leg and a second leg that extend away from the bottom surface of the second finger in a direction away from the first finger, a base of the first leg and a base of the second leg being spaced apart by a distance along a length of the second finger,
wherein the integral hinge is a curved hinge, and
wherein the curved hinge biases a second end of the first finger away from a second end of the second finger.

7. The storage clip of claim 1, wherein the bottom surface of the first finger includes gripping teeth proximate the first end of the first finger.

8. A storage clip comprising:
a first finger having a top surface and a bottom surface;
a second finger having a top surface facing the first finger and a bottom surface facing away from the first finger, the second finger being connected to the first finger with an integral hinge that produces a biasing force such that a first end of the first finger is biased towards a first end of the second finger; and
an integral connector comprising a first leg and a second leg that extend away from the bottom surface of the second finger in a direction away from the first finger, a base of the first leg and a base of the second leg being spaced apart by a distance along a length of the second finger,
wherein the top surface of the second finger includes gripping teeth proximate the first end of the second finger.

9. A storage clip assembly comprising:
a storage clip having a first finger having a top surface and a bottom surface, a second finger having a top surface facing the first finger and a bottom surface facing away from the first finger, the second finger being connected to the first finger by an integral hinge that produces a biasing force such that a first end of the first finger is biased towards a first end of the second finger, and a connector comprising a first leg and a second leg that extend away from the bottom surface of the second finger in a direction away from the first finger, a base of the first leg and a base of the second leg being spaced apart by a distance along a length of the second finger; and
a clothing item located at least partially between the bottom surface of the first finger and the top surface of the second finger.

10. The storage clip assembly of claim 9, wherein the clothing item is a baseball-type hat having a brim and the brim is at least partially located between the first finger and the second finger.

11. The storage clip assembly of claim 9, further comprising a shelf, the storage clip being removably connected to the shelf by the connector.

12. The storage clip assembly of claim 9, wherein the shelf is at least partially located between the first leg and the second leg.

13. The shelf claim assembly of claim 12, wherein a longitudinal axis of the second leg forms an acute angle with the longitudinal axis of the first leg at a projected intersection point, when viewed from a side.

14. The storage clip assembly of claim 12, wherein the second leg includes a turned out foot.

15. The storage clip assembly of claim 9, wherein the integral hinge is a curved hinge.

16. The storage clip assembly of claim 15, wherein the curved hinge is located between a first leg of the connector and a second leg of the connector along a length of the second finger.

17. The storage clip assembly of claim 15, wherein the curved hinge biases a second end of the first finger away from a second end of the second finger.

18. The storage clip assembly of claim 9, wherein the bottom surface of the first finger includes gripping teeth proximate the first end of the first finger.

19. The storage clip of claim 1, wherein the distance approximates the thickness of a shelf to which the storage clip is adapted to be attached.

* * * * *